United States Patent
Koolwal et al.

(10) Patent No.: US 10,614,116 B2
(45) Date of Patent: Apr. 7, 2020

(54) SYSTEMS AND METHODS FOR DETERMINING AND PROVIDING EVENT MEDIA AND INTEGRATED CONTENT IN CONNECTION WITH EVENTS ASSOCIATED WITH A SOCIAL NETWORKING SYSTEM

(71) Applicant: Facebook, Inc., Menlo Park, CA (US)

(72) Inventors: Aditya Brij Koolwal, San Francisco, CA (US); Michael James LeBeau, Brooklyn, NY (US); Jiawen Connie Yang, San Francisco, CA (US); Nicholas John Gavalas, Franklin Square, NY (US)

(73) Assignee: Facebook, Inc., Menlo Park, CA (US)

( * ) Notice: Subject to any disclaimer, the term of this patent is extended or adjusted under 35 U.S.C. 154(b) by 400 days.

(21) Appl. No.: 14/831,764

(22) Filed: Aug. 20, 2015

(65) Prior Publication Data
US 2017/0052650 A1    Feb. 23, 2017

(51) Int. Cl.
| | | |
|---|---|---|
| G06F 16/50 | (2019.01) | |
| H04L 29/08 | (2006.01) | |
| G06Q 50/00 | (2012.01) | |
| G06F 16/487 | (2019.01) | |
| G06F 16/48 | (2019.01) | |
| G06F 3/0484 | (2013.01) | |
| G06F 16/2457 | (2019.01) | |

(52) U.S. Cl.
CPC .......... *G06F 16/50* (2019.01); *G06F 3/04845* (2013.01); *G06F 16/487* (2019.01); *G06F 16/489* (2019.01); *G06Q 50/01* (2013.01); *H04L 67/18* (2013.01); *H04L 67/26* (2013.01); *G06F 16/2457* (2019.01); *G06F 16/24575* (2019.01)

(58) Field of Classification Search
CPC ......... H04L 67/26; H04L 67/18; H04L 67/36; H04L 67/10; G06F 17/30041; G06F 17/30044; G06F 17/30522; G06F 17/30528; G06Q 30/0261; G06Q 50/01
See application file for complete search history.

(56) References Cited

U.S. PATENT DOCUMENTS

| | | | | |
|---|---|---|---|---|
| 2008/0101723 A1* | 5/2008 | Kansal | ................ | G06F 17/3025 382/284 |
| 2012/0166452 A1* | 6/2012 | Tseng | ................ | G06F 17/30867 707/749 |

(Continued)

OTHER PUBLICATIONS

Terrence O'Brien, Google's Photowall for Chromecast lets you doodle on photos, beam them to your TV, Mar. 30, 2014, engadget.com, All pages.*

(Continued)

*Primary Examiner* — Kieu D Vu
*Assistant Examiner* — Roberto Borja
(74) *Attorney, Agent, or Firm* — Sheppard Mullin Richter & Hampton LLP

(57) ABSTRACT

Systems, methods, and non-transitory computer-readable media can receive information about an event. Event attendees are invited to the event. A presence of an event attendee at the event is determined. Content is received from the event attendees present at the event. The content is integrated into event media. The event media is provided for presentation to at least one of the event attendee during the event and an event invitee during or after the event.

18 Claims, 12 Drawing Sheets

(56) References Cited

U.S. PATENT DOCUMENTS

| | | | | |
|---|---|---|---|---|
| 2014/0243019 A1* | 8/2014 | Jenkins | .................. | H04W 4/02 |
| | | | | 455/456.3 |
| 2015/0019523 A1* | 1/2015 | Lior | .................... | G06Q 10/109 |
| | | | | 707/708 |
| 2015/0288779 A1* | 10/2015 | Okumura | ................ | H04L 67/10 |
| | | | | 709/219 |
| 2015/0310040 A1* | 10/2015 | Chan | .................. | G06K 9/00221 |
| | | | | 707/738 |
| 2015/0356121 A1* | 12/2015 | Schmelzer | ........ | G06F 17/30289 |
| | | | | 707/803 |
| 2016/0171220 A1* | 6/2016 | Yu | ........................ | G06F 3/1454 |
| | | | | 726/26 |
| 2018/0253189 A1* | 9/2018 | Jain | ....................... | G06F 3/0481 |

OTHER PUBLICATIONS

U.S. Appl. No. 14/566,656, filed Dec. 10, 2014.

\* cited by examiner

SYSTEMS AND METHODS FOR DETERMINING AND PROVIDING EVENT MEDIA AND INTEGRATED CONTENT IN CONNECTION WITH EVENTS ASSOCIATED WITH A SOCIAL NETWORKING SYSTEM

TECHNICAL FIELD

The technical field relates to the field of social networks. More particularly, the technical field relates to media management techniques in social networks.

BACKGROUND

Social networks provide interactive and content-rich online communities that connect members with one another. Members of social networks may indicate how they are related to one another. For instance, members of a social network may indicate that they are friends, family members, business associates, or followers of one another, or members can designate some other relationship to one another. Social networks often allow members to message each other or otherwise communicate within an online community.

Social networks may allow members to share content with one another. For example, members may have pages that can be viewed across a multitude of platforms. The pages may contain images, video, and other content that a member wishes to share with certain members of the social network or to publish to the social network in general.

In certain instances, shared content may relate to events in which members have participated.

SUMMARY

Various embodiments of the present disclosure can include systems, methods, and non-transitory computer readable media configured to receive information about an event. Event attendees are invited to the event. A presence of an event attendee at the event is determined. Content is received from the event attendees present at the event. The content is integrated into event media. The event media is provided for presentation to at least one of the event attendee during the event and an event invitee during or after the event.

In an embodiment, notifications are integrated into the event media.

In an embodiment, an application on a computing device of at least one of the event attendee and the event invitee is caused to enter a special mode to receive the event media in response to at least one of the determining the presence of an event attendee at the event and determining arrival of a time associated with occurrence of the event.

In an embodiment, position and time information is received from a computing device associated with the event attendee to determine whether the event attendee is present at the event.

In an embodiment, the content is ranked prior to integration of the content into the event media.

In an embodiment, information from a computing device associated with a host of the event is received to control the integration of the content into event media.

In an embodiment, first event media is selected for presentation on an event display system visible to the event attendees. Second event media is selected for presentation on a computing device of the event attendee.

In an embodiment, the first event media is provided to a computing device associated with a host of the event in communication with the event display system.

In an embodiment, content relevant to the event attendees is identified based on social affinity to select the first event media.

In an embodiment, content relevant to the event attendee is identified based on social affinity to select the second event media.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
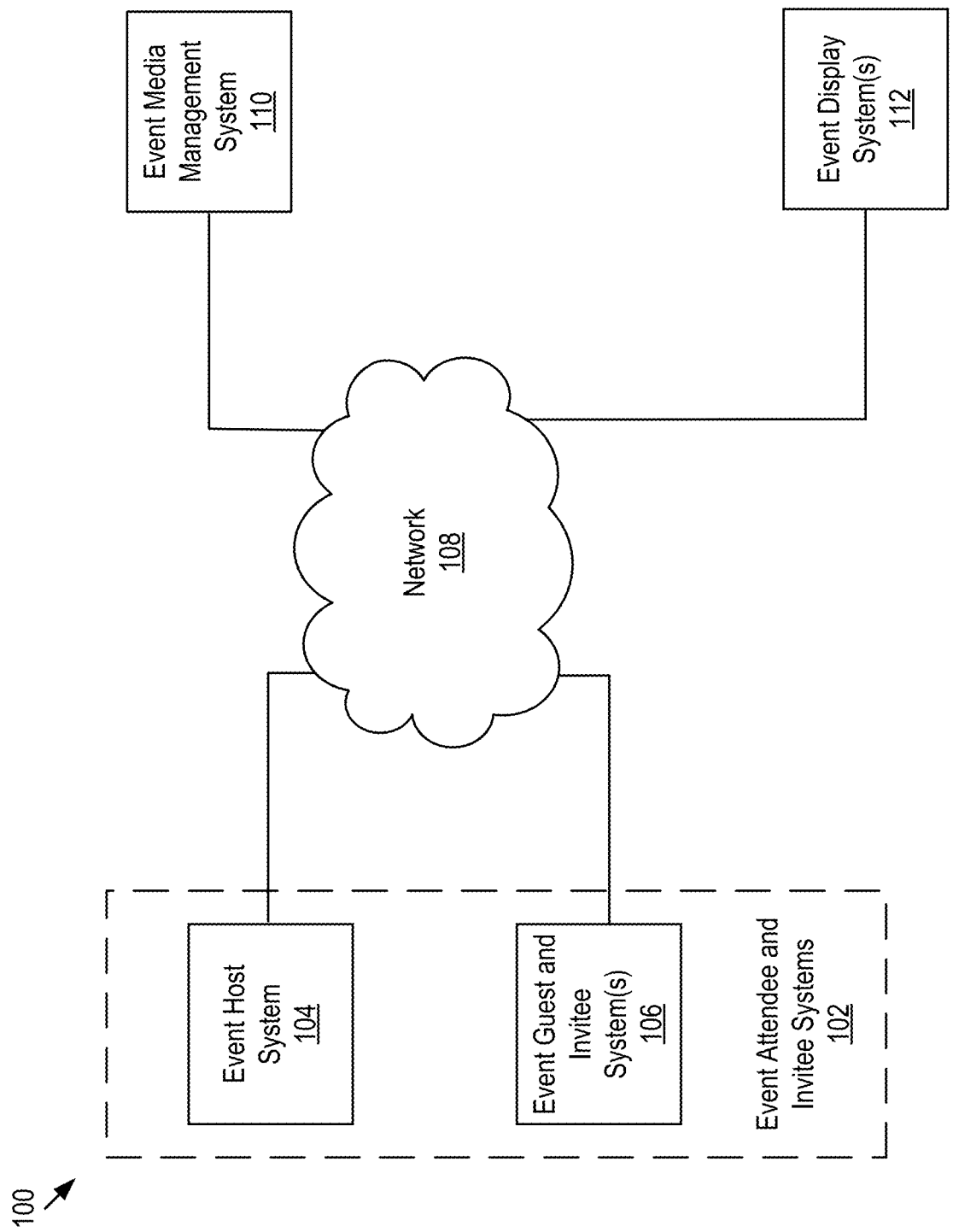
FIG. 1 shows an example event media management environment, in accordance with some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles described herein.

DETAILED DESCRIPTION

Event Media Management Systems and Methods

A social networking system may provide users with the ability to generate content and share it with friends. Users of a photo-sharing service of the social networking system may capture images, video, audio, or other interactive content on their computing devices and share the content with their online friends.

Although social networks allow users to share content related to an event, the act of sharing content over a social network is often disconnected from the event. Content may be shared in a manner that is not chronologically proximate to the occurrence of the event. Further, the content, when shared, may not be published to an audience most potentially interested in the content, such as those persons who are participating in the event or were invited to the event.

In various embodiments, the systems and methods described herein provide real time (or near real time) sharing of content (e.g., event media) with persons directly or indirectly connected to events. More specifically, the systems and methods described herein allow a person to host a representation of a real-world event using a social networking system or related social networking application. During the event, event attendees or event invitees can enter a special mode ("event mode"), which provides attendees and invitees, based on privacy settings, affinity, and other considerations, content and information as event media and allows attendees and invitees to contribute content and information to be integrated into the event media. Event invitees, as used herein, can include persons who were invited to the event and physically attended the event or persons who were invited to the event but did not physically attend the event or both. As persons who did not physically attend the event, event invitees can include persons who remotely participated in the event or persons who did not participate at all in the event or both. In various embodiments, the event media is displayed on event attendees' and event invitees' computing devices through the social networking application. The event media also may be shown on group display devices located at the site of the event for all event attendees to view.

FIG. 1 shows an example diagram 100 of an event media management environment, in accordance with some embodiments. The event media management environment in the diagram 100 includes event attendee and invitee systems 102, a network 108, an event media management system 110, and event display system(s) 112. The couplings shown in FIG. 1 are by way of illustration only, and it is noted one or more of the event attendee and invitee systems 102, the network 108, the event media management system 110, and the event display system(s) 112 may be coupled to one another or to other systems not explicitly illustrated in FIG. 1. The embodiments, features, and functionality relating to event attendees and event invitees, as expressly discussed herein, also apply to persons including those persons 1) who are currently physically at an event, 2) were previously physically at the event, and 3) who were never physically at the event but have some interest or connection to the event, depending on the privacy of the event, which may be an invitee or a non-invitee.

The event attendee and invitee systems 102 may include computer systems associated with attendees and invitees of an event. Attendees and invitees of an event may include a host and guests of the host (or event participants) as well as invitees who did not attend the event. An event may include any real-world occurrence that involves a social gathering of people, such as a party, a get-together, a concert, a sporting event, etc. An event can be indoor or outdoor, or can correspond to a specific geographical area (e.g., several neighborhoods of a city) that is limited by specified boundaries. An event also can include an occurrence that spans multiple, scattered, noncontiguous, or unbounded geographic regions that may be time-bounded (e.g., a New Year's Eve celebration around the globe, a birthday celebration occurring in different homes of family members, etc.). A computer system, as used herein, may include any device having a memory and a processor. Examples of computer systems include a mobile phone, a tablet computing device, a laptop, and a desktop computer. An example of a computer system is provided in FIG. 8. The event attendee and invitee systems 102 include an event host system 104 and event guest and invitee system(s) 106.

The event host system 104 may include a computer system that is associated with a host of the event. In an embodiment, the event host system 104 comprises a mobile computing device associated with the host of the event. The event host system 104 may have a social networking (mobile) application installed on it (e.g., as a native application) or otherwise accessible to it (e.g., through a web browser) to support the functionality discussed herein. The social networking application on the event host system 104 may include some or all of the components of the social networking environment shown in FIG. 7. The event host system 104 allows the host to host a representation of an event using the social networking application. More specifically, the event host system 104 may allow a host to create, view, and manage a representation of the event.

For example, a representation of the event can be created by the host providing a time, a location, a guest list, and other information for the event. Once invitations to the event have been sent to guests, an attendee roster has been confirmed, and the presence of guests at the event has been verified, the event host system 104 may allow the event guest and invitee system(s) 106 to enter a special mode ("event mode"), as discussed further herein. When in the special mode, the event host system 104 may be allowed to act as an administrator to manage the event by in part controlling which content is presented to the event attendees in the event display system(s) 112, providing content that is promoted on the social networking applications of event guest and invitee system(s) 106, facilitating interactions (e.g., facilitating meetings or introductions) between event attendees, and taking other actions to manage the event. In some instances, instead of or in addition to the event display system(s) 112, content can be presented on a display or screen of a mobile computing device (user device) associated with an event attendee or event invitee, for example, when the event is a physical event but the event invitee cannot attend and the event invitee therefore can see a feed of what is being displayed at the event on the mobile computing device of the event invitee, or when the event is not a physical event so that the event invitees see a unified feed on their own computing devices. In various embodiments, the special mode may be exited once each event attendee or event invitee leaves the event or indicates no interest in the event or when the event has finished.

The event guest and invitee system(s) 106 may include one or more computer systems that are associated with guests and/or invitees of the event. The event guest and invitee system(s) 106 can each comprise a mobile computing device associated with a guest or invitee of the event. Each of the event guest and invitee system(s) 106 may have the social networking application installed on or otherwise accessible to it to enable and support the functionality discussed herein. The event guest and invitee system(s) 106 allow guests and invitees of the event to participate in the representation of the event using the special mode of the social networking application. For example, the event guest and invitee system(s) 106 may receive invitations to the event, and may allow guests and invitees to confirm or deny their attendance at the event. At or near the time and location of the event, the event guest and invitee system(s) 106 may confirm (or not confirm) the presence of guests or invitees at the event based on geolocational data, manual check-ins, or other technologies. In an embodiment, the event guest and invitee system(s) 106 can enter the special mode of the social networking applications in response to confirming the presence of the event guest and invitee system(s) 106 at the event or determining the arrival of a time associated with occurrence of the event.

The social networking applications of the event host system 104 and the event guest and invitee system(s) 106 also allow event attendees and invitees to edit, upload, and view content generated before, during, or after the event. For example, the social networking application may allow an event attendee or event invitee to edit an image, video, or audio. In this regard, the social networking application may allow the event attendee or event invitee to annotate or otherwise modify or personalize visual content. An example of modification and personalization includes manual drawings (e.g., doodles) over profile pictures (or other images) of an event attendee or event invitee generated by another event attendee or event invitee. As another example, the social networking application may allow an event attendee or event invitee to crop, enlarge, or perform other edits to content before uploading the content to the event media management system 110. As yet another example, a playlist of content (e.g., audio, video) can be provided by a third party website for the event in communication with one or more of the event attendee and invitee systems 102, the event media management system 110, or the event display system 112. One or more songs of the playlist (e.g., a currently playing song) can be presented to one or more event attendees and/or event invitees on the event display system(s) 112 and/or on the mobile computing devices of the event attendees and/or event invitees to allow them to control (e.g., change) the selection of content items in the playlist (e.g., to select a desired song). In this example, a queue of content items selected by event attendees and event invitees can be created for presentation.

The network 108 may include a computer network. The network 108 may include wired or wireless technologies. In some embodiments, the network 108 corresponds to at least a portion of the network 750, shown in FIG. 7 and discussed further herein.

The event media management system 110 may manage the representation of the event. The event media management system 110 may be integrated with a social networking system, as discussed in connection with FIG. 7. The event media management system 110 may receive instructions to create a representation of an event from the event host system 104. In various embodiments, the event media management system 110 receives an event time, event location, and event guest list from the event host system 104. The event media management system 110 may provide event invitations to the event guest and invitee system(s) 106. At or near the time of the event, the event media management system 110 may determine whether each event attendee or event invitee is present at the site of the event using geolocational data, manual check-ins, or other technologies discussed further herein.

In some embodiments, the event media management system 110 can cause the event attendee and invitee systems 102 to enter the special mode of the social networking application on the event attendee and invitee systems 102. While the event attendee and invitee systems 102 are in the special mode, the event media management system 110 may provide information about the event (e.g., attendance rosters, profiles of attendees, friendship statuses of attendees, other social data of attendees, etc.). The event media management system 110 may also allow event attendees and event invitees to capture and share content (e.g., images, videos, posts, etc.) with one another and with other users of a social networking system. In some embodiments, the event media management system 110 allows event attendees and event invitees to connect with (i.e., "friend") one another and take other actions that are facilitated by the social networking system. The event media management system 110 may also solicit content from event attendees and event invitees by determining the types of content being shared during the event and encouraging production of similar content. For example, the event media management system 110 may encourage event attendees and event invitees to create and share content about the event.

Figure 2:
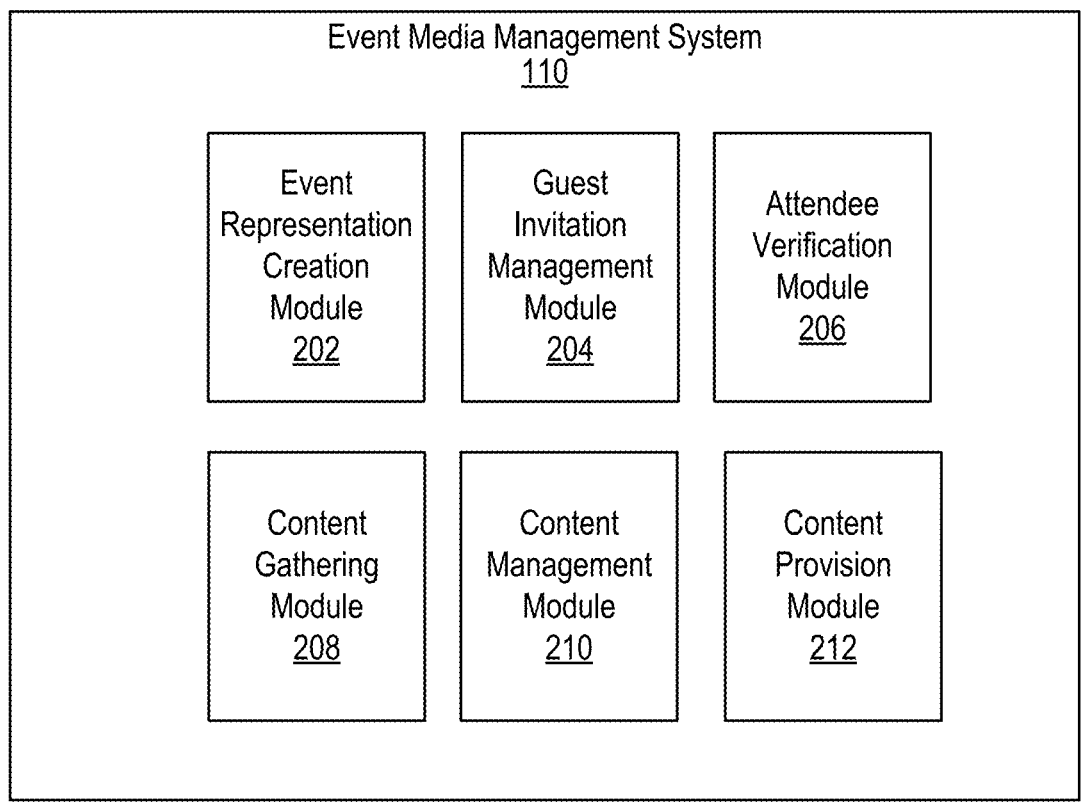
FIG. 2 shows an example event media management system, in accordance with some embodiments.

The event media management system 110 integrates the interactions of event attendees and event invitees and content from event attendees and event invitees into event media. In various embodiments, portions of social networking applications (such as interactive feeds, message boards, content albums, message inboxes, etc.) of event attendee and invitee systems 102 may display event media. Further, in various embodiments, event media can be incorporated into a channel for presentation on the event display system(s) 112, as discussed further herein. FIG. 2 shows the event media management system 110 in greater detail.

The event display system(s) 112 may include one or more computer systems that are resident at the location of the event. In various embodiments, the event display system(s) 112 comprise large screen devices, such as a television, a monitor, a projector, a streaming media device, etc. The event display system(s) 112 can include, for example, a connected television, such as an Apple® television, or a digital display device coupled to a Chromecast® dongle, a Roku® unit, etc. The event display system(s) 112 can be communicatively coupled to the event host system 1-4 through a wireless or wired connection. The event display system(s) 112 may display event media managed by the event media management system 110 and provided by the event host system 104 through a local area wireless (or wired) technology (e.g., Wi-Fi). For example, the event display system(s) 112 may be configured to display roster(s) of event attendees and event invitees, content captured at the event, messages sent by event attendees, friendship statuses of event attendees, other social data of or notifications relating to event attendees. In some instances, the event display system(s) 112 can include screens associated with a mobile computing device of an event attendee, for example, when a large screen device associated with an event is not available or suitable or when the event attendee is not present at a location associated with the event for which a large screen is available.

FIG. 2 shows a diagram 200 of an example event media management system 110, in accordance with some embodiments. The event media management system 110 includes an event representation creation module 202, a guest invitation management module 204, an attendee verification module 206, a content gathering module 208, a content management module 210, and a content provision module 212. The components (e.g., modules, elements, etc.) shown in this figure and all figures herein are exemplary only, and other implementations may include additional, fewer, integrated, or different components. Some components may not be shown so as not to obscure relevant details. One or more of the event representation creation module 202, the guest invitation management module 204, the attendee verification module 206, the content gathering module 208, the content management module 210, and the content provision module may be coupled to one another or to modules not explicitly shown in FIG. 2.

The event representation creation module 202 may facilitate creating a representation of an event. In various embodiments, the event representation creation module 202 receives from an event host system 104 information about an event, such as a time, a location, and a guest list associated with an event. The event representation creation module 202 may create a representation of the event in a format that is compatible with the social networking application. For example, the event representation creation module 202 may create a calendar object in the social networking application using the information about the event. In some embodiments, the event representation creation module 202 provides information related to the representation of the event (e.g., the time, place, guest list, etc.) to the other modules of the event media management system 110.

The guest invitation management module 204 may invite guests (or invitees) to the event. More specifically, the guest invitation management module 204 may receive the guest list for the event from the event representation creation module 202 and may identify specific users on the guest list. In an embodiment, the guest invitation management module 204 sends the invitations for receipt by the social networking application. The invitations may be provided to guests in a variety of formats, including as messages in the social networking application, as push notifications in the social networking application, as calendar entries, as emails, as Short Message Service (SMS) messages, etc. The guest invitation management module 204 may also keep track of guests who have accepted invitations and/or declined invitations. The guest invitation management module 204 may provide lists of guests who have accepted invitations and/or declined invitations to the other modules of the event media management system 110.

The attendee verification module 206 may verify the presence of attendees at the event. More specifically, the attendee verification module 206 may determine whether people invited to the event are at (or near) the location of the event at (or near) the time of the event. In some embodiments, the attendee verification module 206 uses geolocational technologies to verify whether people invited to the event (e.g., the host and guests) are present at the location of event at the time of the event. In an embodiment, an event host system 104 may determine the presence of attendees at the event based on geolocational technologies of the event host system 104 and other event guests system(s) 106. One example of geolocational technologies that may be used includes Bluetooth Low Energy. In this regard, the event host system 104 can act as a beacon in relation to the position of the event guest and invitee system(s) 106 of other event attendees. In some instances, a mobile computing device of one or more event attendees likewise can function as a beacon and other event attendees can be verified upon detection by their mobile computing devices of the beacon. Another example of the geolocational technologies that may be used includes Global Positioning System (GPS). The attendee verification module 206 may verify whether the position information of event guest and invitee system(s) 106 of invited guests corresponds to a location of the event at the scheduled time of the event. The identities of attendees determined to be present at the event can be logged by the attendee verification module 206.

In various embodiments, the attendee verification module 206 uses manual check-ins to verify whether the host and/or invited guests are at the event. For example, the attendee verification module 206 can determine whether the event guest and invitee system(s) 106 have used the social networking application to check into the representation of the event. If event guest and invitee system(s) 106 have checked into the representation of the event on the social networking application, the attendee verification module 206 may determine the event guest and invitee system(s) 106 are at the location of the event at the scheduled time of the event.

Based on a determination that an event attendee is present at the event, the attendee verification module 206 can cause the special mode of the social networking applications on the event guest system 106 to be entered. Likewise, when it is determined that a host is present at the event, the attendee verification module 206 can cause the special mode of the event host system 104 to be entered. In some instances, the special mode of the event host system 104 can be entered by an event invitee not present at the event when arrival of a time of occurrence of the event is determined. In some embodiments, the attendee verification module 206 provides, using the social networking application, the event attendee and invitee systems 102 with a push notification about an event. When event attendee and invitee systems 102 respond to the push notification with an appropriate indication of assent, the attendee verification module 206 may cause the social networking application to enter the special mode. Upon entry of the special mode, the event attendee and invitee systems 102 can be configured to receive event media regarding the event and generate content for inclusion in the event media.

The content gathering module 208 may gather content from the event host system 104 and the event guest and invitee system(s) 106. The content gathering module 208 may gather social media posts, images, videos, and other content generated by the event host system 104 and the event guest and invitee system(s) 106. The content gathering module 208 may also gather annotations of and other modifications to content generated by the event host system 104 and the event guest and invitee system(s) 106 during the event. An example of modifications to content can include manual drawings (e.g., doodles) over images by one or more event attendees or event invitees.

The content management module 210 may manage content obtained by the content gathering module 208. Subject to privacy settings, the content management module 210 can generate and select content and information for presentation as event media on the event host system 104, the event guest and invitee system(s) 106, and the event display system(s) 112. In some embodiments, the content management module 210 generates event media related to the event based on content obtained by the content gathering module 208. An example of generated content includes a "photo pile" that comprises a collection of images (or video) uploaded by event attendees or event invitees during the event that appear as a stack of images that event attendees and event invitees can sequentially view on their social networking applications.

The content management module 210 can automatically generate other event media including information regarding event attendees and event invitees, such as relationships, statuses, likes, profile information, background information, etc. For example, the content management module 210 can determine the connection status (i.e., degrees of separation between two event attendees or event invitees) for potential presentation to event attendees and event invitees. As another example, the content management module 210 can determine that an event attendee or event invitee liked (i.e., fanned) content of another event attendee or event invitee (or other entity with the social networking system) during or prior to the event for potential presentation to event attendees and event invitees. As yet another example, the content management module 210 can identify a field of profile information relating to an event attendee or event invitee for potential presentation to event attendees and event invitees. Many other examples are possible.

In some embodiments, the content management module 210 identifies content related to particular sentiments of event attendees or event invitees related to the event and assembles the content into event media. For example, the content management module 210 may identify information that several event attendees or event invitees posted content that indicated they were happy (or sad) during the event. Such information can be conveyed by, for example, words or emoticons selected through the social networking application that convey the sentiments of the event attendees or event invitees. The content management module 210 may reflect these sentiments in event media that are displayed to event attendees and event invitees. For example, the content management module 210 can select images that show event attendees or event invitees smiling (or not smiling).

In some embodiments, the content management module 210 can analyze and rank content for presentation to event attendees and event invitees. The content can be analyzed based on one or a combination of criteria. The criteria can be based at least in part on potential relevance to the event or event attendees or event invitees. For example, the content can be ranked according to its associated time of creation. In this regard, the content that has been created most recently in relation to a current time of the event can be ranked higher and the content that has been created least recently in relation to a current time of the event can be ranked lower. As another example, content such as an image determined to reflect a larger number of event attendees or event invitees can be ranked higher than content determined to reflect a smaller number of event attendees or event invitees. The determination of the number of event attendees or event invitees reflected in content can be performed by, for example, facial recognition techniques. As yet another example, content generated by the host may be ranked higher than content generated by other event attendees or event invitees. The content can be provided for presentation based on its ranking.

The content management module 210 can determine what content to present to all event attendees and event invitees through the event display system(s) 112 and what different content to present to specific event attendees through the event attendee and invitee systems 102. The content management module 210 can select content and information as event media that is more suitable or relevant for a broad audience for presentation in real-time (or near real-time) to all event attendees or event invitees. Content suitable for a broad audience can include, for example, content that reflects a threshold number of event attendees or event invitees, real-time notifications regarding the arrival or departure of event attendees, real-time notifications regarding activities of the event, information regarding connections between event attendees or event invitees, content or information published by the host, event attendees, event invitees, etc. In some instances, such content can be deemed more relevant based on the social affinity between the content and the event attendees or event invitees. The event content management module 210 also can select content and information as event media that is more suitable or relevant for an individual event attendee or event invitee for presentation in real-time (or near real-time) to that event attendee or event invitee. Content suitable for an individual can include, for example, content that the event attendee or event invitee has created during the event, content that friends (i.e., connections of the first order) of the event attendee or event invitee have created during the event, information regarding the arrival and departure of friends in relation to the event, etc. Such content can be deemed more relevant based on the social affinity between the content and the individual event attendee or event invitee. In some embodiments, the content management module 210 can select the same content or information for presentation at various times to the event display system(s) 112 and the event attendee and invitee systems 102.

In some embodiments, the content management module 210 can determine the order of presentation of the content and information selected for presentation. For example, content can be ordered for presentation according to its ranking. As another example, content that has satisfied a threshold rank value can be presented randomly.

In some embodiments, the content management module 210 can provide some or all content and information for potential presentation to the event host system 104 before presentation to any other event attendee and invitee systems 102. The social networking application of the event host system 104 can allow the host to approve or disapprove of the content to be presented. The social networking application of the event host system 104 can provide information that controls the potential presentation of content and information and their integration into event media. In this way, the event host system 104 can exercise control over the publication of content and information to event attendees and event invitees.

In some embodiments, the content management module 210 can collect images or video taken by one or more event attendees or event invitees from different locations of the event. The different locations of the event can be determined from metadata associated with the images or video. The content management module 210 can combine images and video from different locations to create content for presentation to event attendees and event invitees that provides varying locational perspectives of the event. Likewise, the content management module 210 can collect and combine content generated at different times during the event to create content with varying time perspectives.

The content provision module 212 may control the provision of content to the event attendee and invitee systems 102 and the event display system(s) 112. The content provision module 212 can provide as a first type of event media the content selected for presentation to all event attendees to the event host system 104 to be displayed by the event display system(s) 112. Likewise, the content provision module 212 can provide as a second type of event media the content selected for presentation to a particular event attendee or event invitee to the event guest and invitee system 106 associated with the particular event attendee or event invitee.

The content provision module 212 may communicate with and manage the social networking applications on the event attendee and invitee systems 102 to control the presentation of content and information. The content provision module 212 may cause the social networking application on the event attendee and invitee systems 102 to display content and information as event media while the event attendee and invitee systems 102 are in the special mode. In some embodiments, the content provision module 212 may cause display of one or more user interface elements in attendees' and invitees' social networking applications that allow attendees and invitees to view content and information about the event. For example, the content provision module 212 may cause attendees' and invitees' social networking applications to display a roster of event attendees. The roster may include profile pictures, background information, likes, friendships, relationships, statuses, and other social data associated with the event attendees. As another example, the content provision module 212 may configure attendees' and invitees' social networking applications to provide directions to parts (e.g., different locales) of the event. As yet another example, the content provision module 212 may configure attendees' and invitees' social networking applications to display event media from the event. The event media may include images, video, posts, etc. associated with the event. The relevant event media may also include annotations of content (e.g., doodles, etc.) generated by event attendees or event invitees.

In various embodiments, the content provision module 212 can cause news feeds in attendees' and invitees' social networking applications to favor content from the host and/or the event. For example, the content provision module 212 may modify (bias) a newsfeed algorithm of attendees' and invitees' social networking applications to promote event media from the event media management system 110 over other types of content.

The content provision module 212 can manage a channel of content and information to be displayed by event display system(s) 112 through the event host system 104. The event media to be displayed to all attendees, as determined by the content management module 212, can be provided from the content provision module 212 to the event host system 104. Based on a communication link (e.g., a LAN connection, such as Wi-Fi), the event host system 104 can provide the channel of event media to the event display system(s) 112 for presentation to all event attendees.

In some embodiments, the content provision module 212 can provide content and information about the event to users (event invitees) who are not at the event. The content and information about the event can be provided to such users before, during, or after the event. The content provision module 212 can provide, for example, notifications about who is (was) in attendance at the event and who is (was) not in attendance at the event. As another example, the content provision module 212 can provide, subject to privacy settings, content shared by event attendees to such users. In some circumstances, the provision of content and information about the event to such users can facilitate a determination by such users about whether to attend the event. In other circumstances, the provision of content and information about the event to such users can allow the user to experience the event when they for some reason are not or were not able to attend in person.

In some embodiments, the content provision module 212, after the event, can provide content and information about the event to event attendees and event invitees (or others). The content and information can be provided in a news feed of a page associated with each event attendee, event invitee, or other person. In some embodiments, a permalink (or other designation or repository) associated with the event can be created to access information about an event after its conclusion. One or more of an event host, event attendee, event invitee, or other person (e.g., event non-invitee) can share content regarding the event to the permalink. If content is shared to the permalink, a notification can be sent to event attendees and event invitees. In some embodiments, after the event has concluded and after a selected time has passed to allow persons to share content regarding the event, the event media management system 110 or the content provision module 212 can prompt the event host (or event attendee or event invitee) to curate, for example, a "thank-you" story expressing gratitude for attendance at, participation in, or interest in the event. The story can include one or more content items (e.g., an image, a video, an album of images and/or video, etc.) relating to the event along with a message. The story can be provided to event attendees and event invitees in accordance with applicable privacy selections. Provision of the story can be sent directly to a story recipient or appear in a news feed of the story recipient.

The event media management system 110 can be configured to communicate and/or operate with the at least one data store (not shown). The at least one data store can be configured to store and maintain various types of data to support the function of the event media management system 110. In some implementations, the at least one data store can store information associated with the social networking system (e.g., the social networking system 730 of FIG. 7). The information associated with the social networking system can include data about users, social connections, social interactions, locations, geo-fenced areas, maps, places, events, guests, guest attendance, content and information created by guests, event media, pages, groups, posts, communications, content, feeds, account settings, privacy settings, a social graph, and various other types of data.

Figure 3:
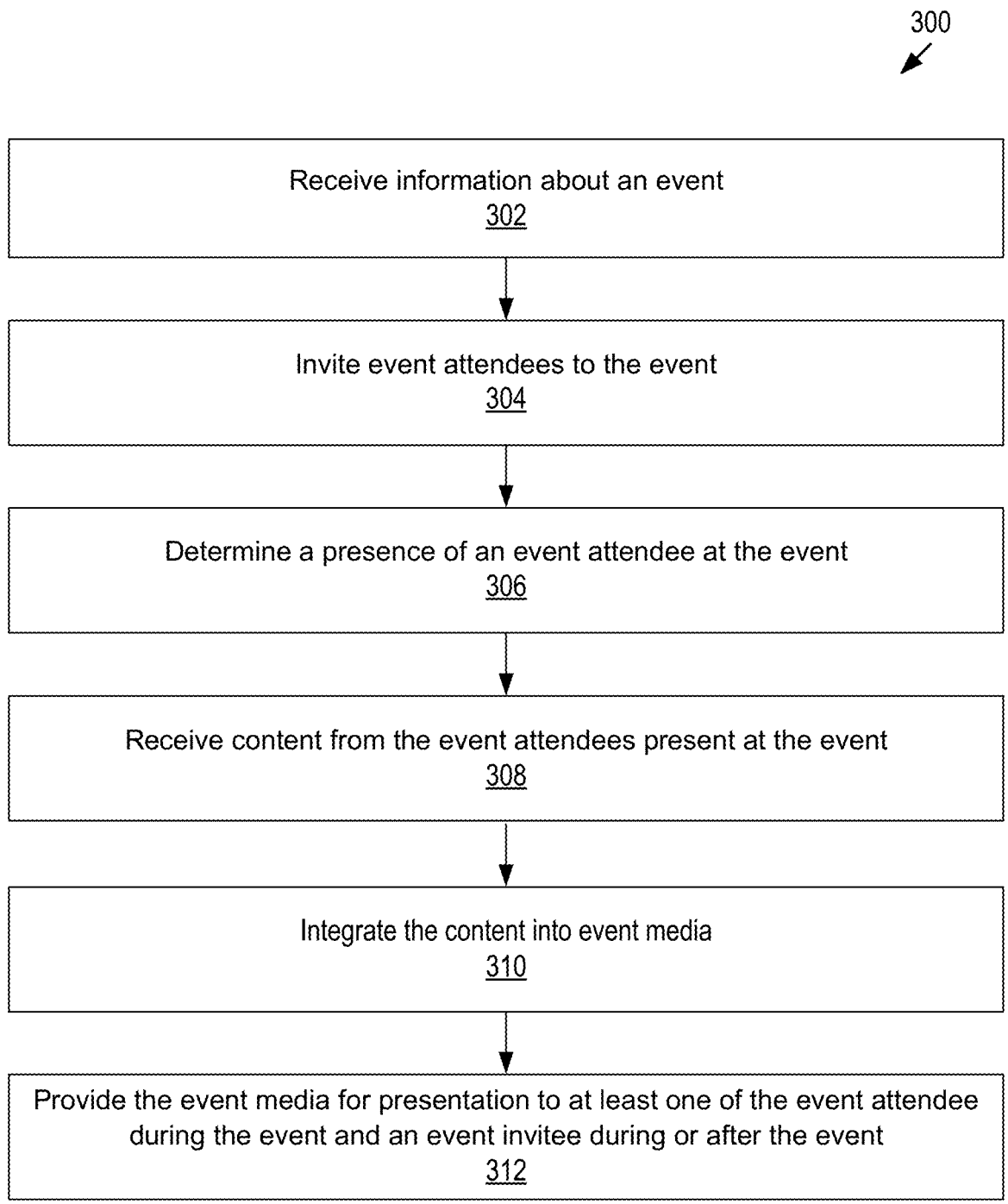
FIG. 3 shows an example method for managing event media, in accordance with some embodiments.

FIG. 3 shows an example method 300 for managing event media, in accordance with some embodiments. The method 300 can be performed by the event media management system 110. At block 302, the method 300 can receive information about an event. At block 304, the method 300 can invite event attendees to the event. At block 306, the method 300 can determine a presence of an event attendee at the event. At block 308, the method 300 can receive content from the event attendees present at the event. At block 310, the method 300 can integrate the content into event media. At block 312, the method 300 can provide the event media for presentation to at least one of the event attendee during the event and an event invitee during or after the event. Many variations incorporating the embodiments and features described herein are possible.

Figure 4:
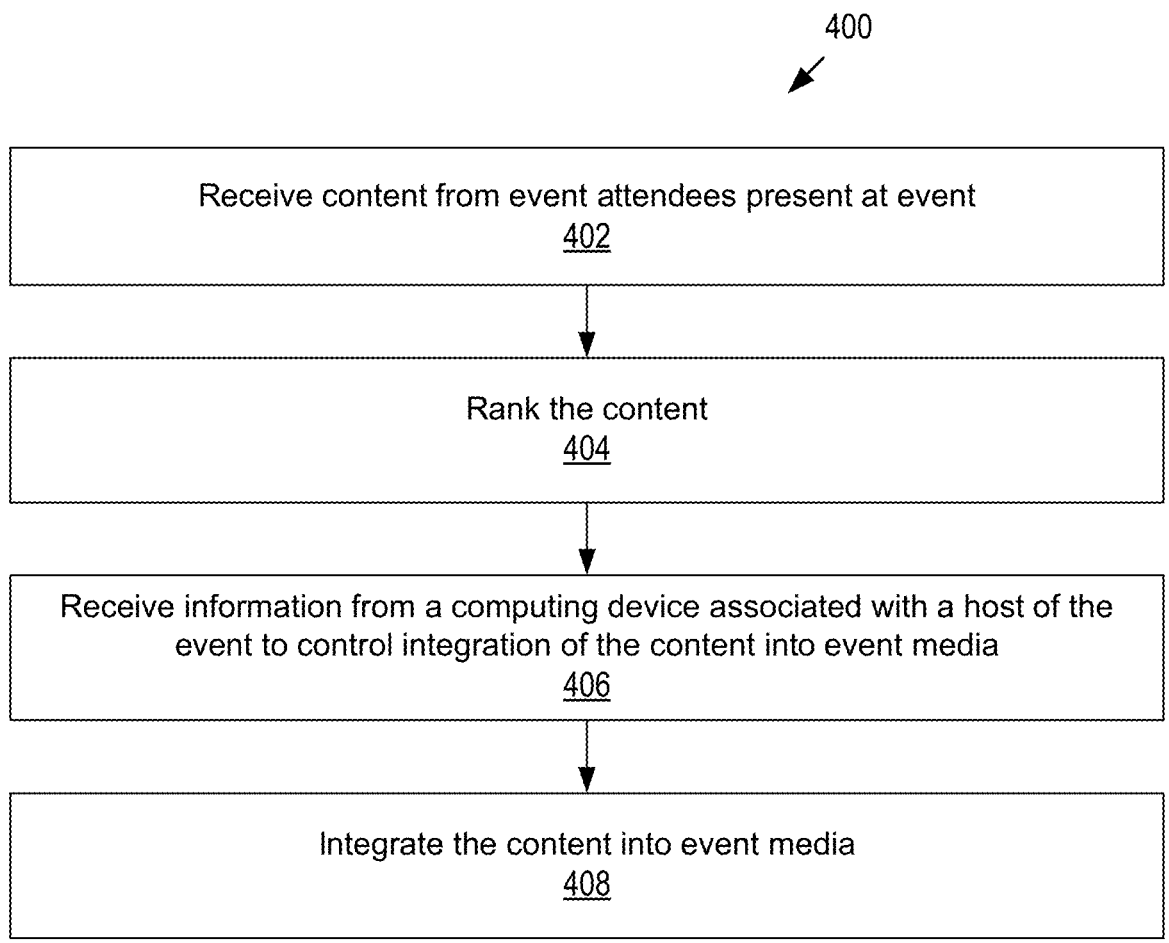
FIG. 4 shows an example method for managing event media, in accordance with some embodiments.

FIG. 4 shows an example method 400 for managing event media, in accordance with some embodiments. The method 400 can be performed by the event media management system 110. At block 402, the method 400 can receive content from event attendees present at event. In some instances, content also can be received from event invitees. At block 404, the method 400 can rank the content. At block 406, the method 400 can receive information from a computing device associated with a host of the event to control integration of the content into event media. At block 408, the method 400 can integrate the content into event media. Many variations incorporating the embodiments and features described herein are possible.

Figure 5:
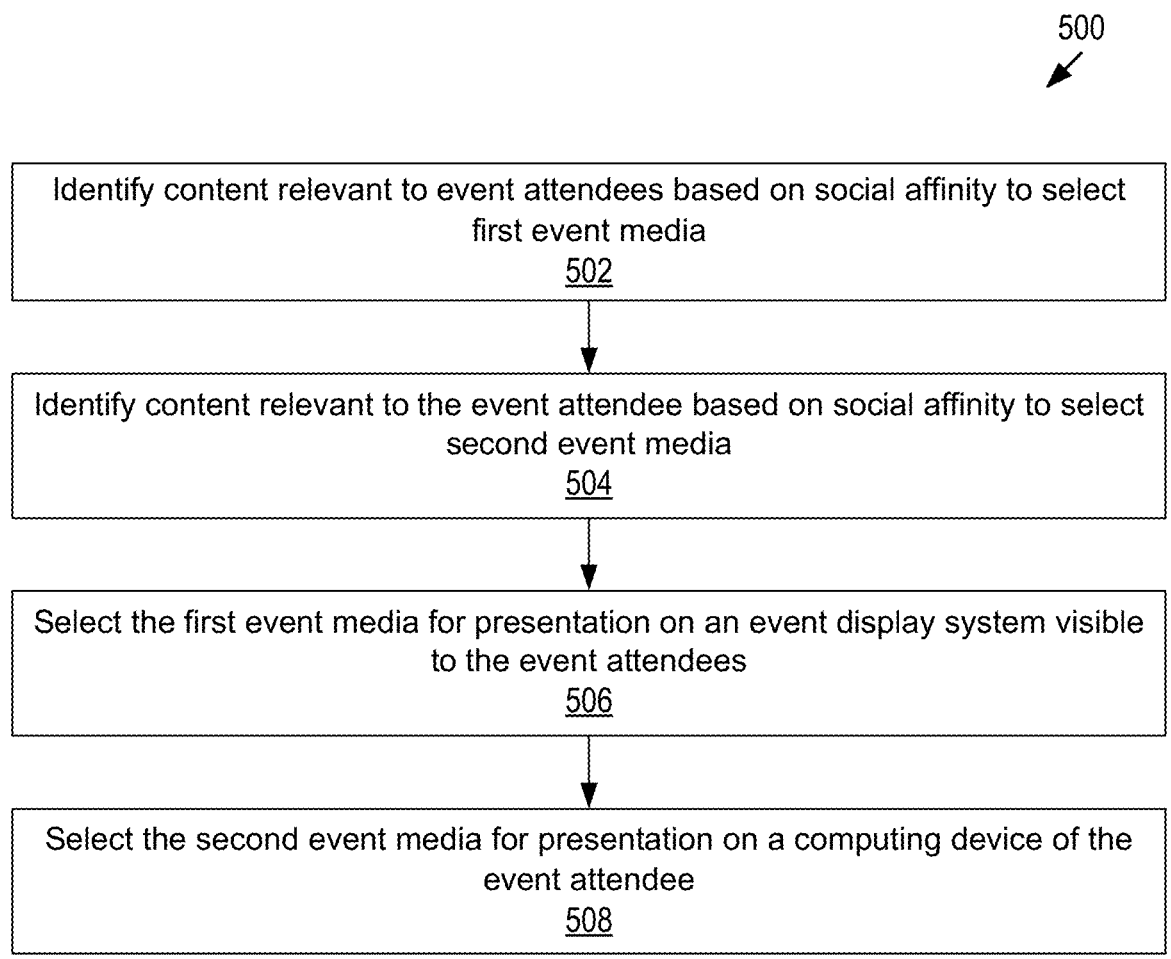
FIG. 5 shows an example method for managing event media, in accordance with some embodiments.

FIG. 5 shows an example method 500 for managing event media, in accordance with some embodiments. The method 500 can be performed by the event media management system 110. At block 502, the method 500 can identify content relevant to event attendees based on social affinity to select first event media. At block 504, the method 500 can identify content relevant to the event attendee based on social affinity to select second event media. At block 506, the method 500 can select the first event media for presentation on an event display system visible to the event attendees. At block 508, the method 500 can select the second event media for presentation on a computing device of the event attendee (and/or an event invitee). Many variations incorporating the embodiments and features described herein are possible.

Figure 6A:
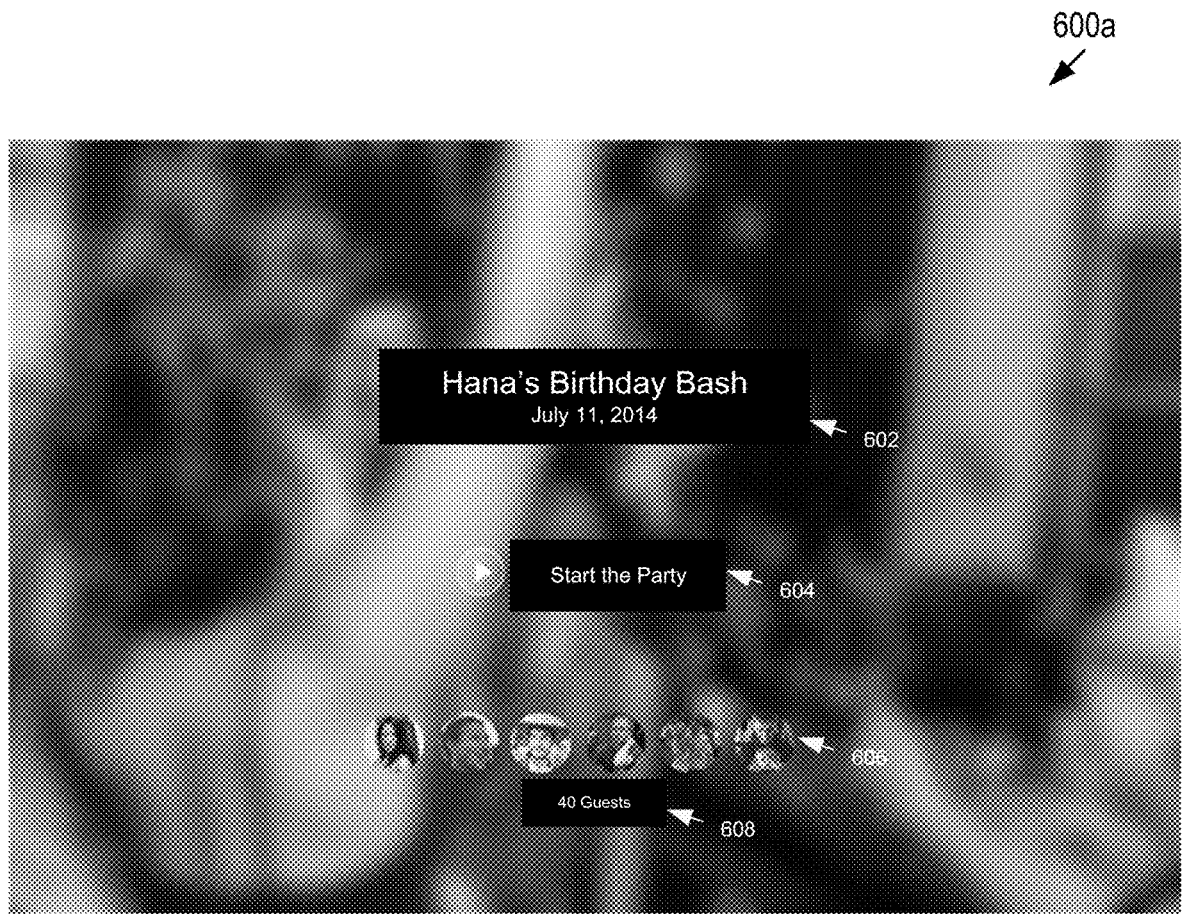
FIG. 6A shows an example screen of an application on an event display system, in accordance with some embodiments.

FIG. 6A shows an example of a screen 600a of an application presented on an event display system, in accordance with some embodiments. In this example, the screen 600a corresponds to a splash screen on the event display system 112. The screen 600a includes an event title 602, an interaction button 604, an attendance roster 606, and a count of invitees 608. The interaction button 604 may be selected by a host to begin the presentation of event media relating to the event. The attendance roster 606 may be based on a determination of which invitees are in actual attendance at the event.

Figure 6B:
FIG. 6B shows an example screen of an application on an event display system, in accordance with some embodiments.

FIG. 6B shows an example of a screen 600b of an application presented on an event display system, in accordance with some embodiments. In this example, the screen 600b corresponds to a screen on the event display system 112. The screen 600b shows a photo pile 610 of images uploaded by event attendees. A field 612 identifies the event attendee who uploaded a top image of the photo pile 610 along with other event attendees.

Figure 6C:
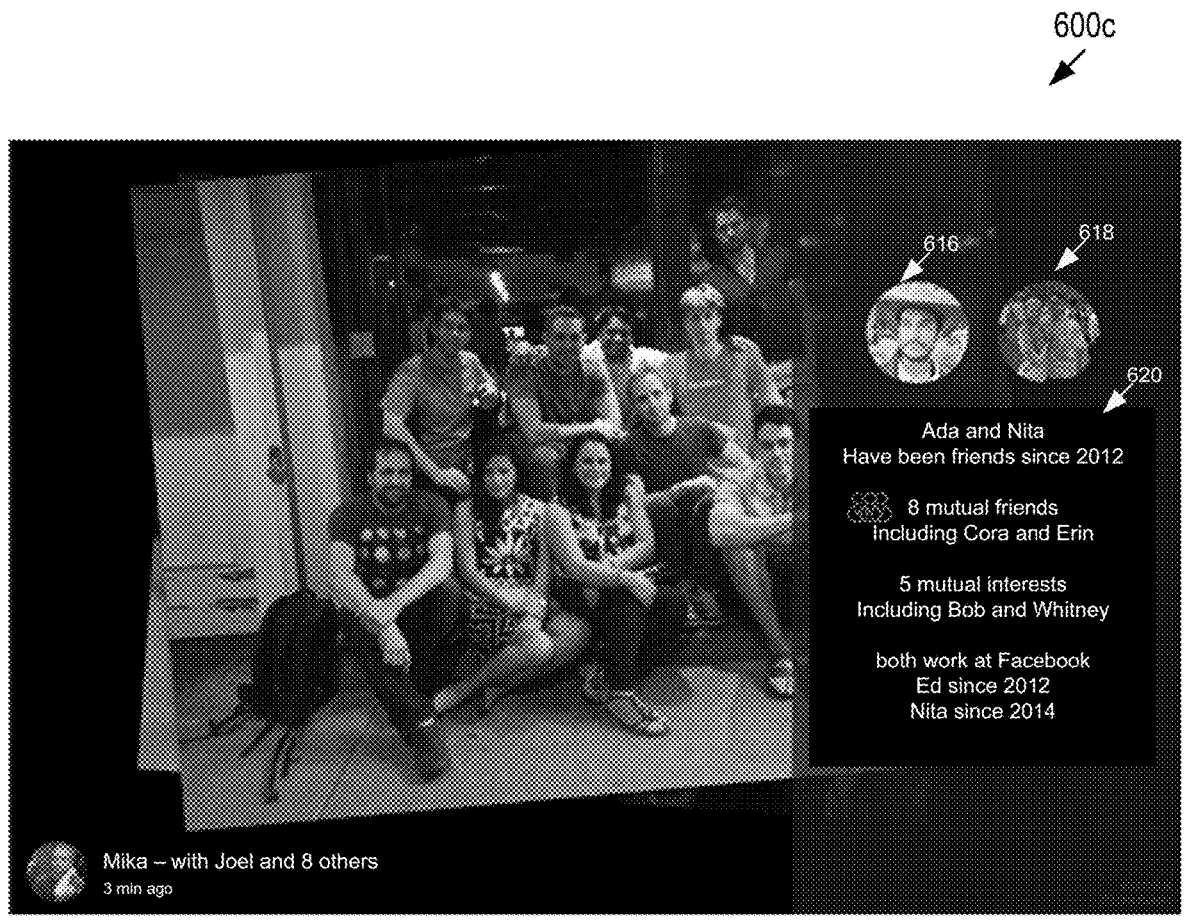
FIG. 6C shows an example screen of an application on an event display system, in accordance with some embodiments.

FIG. 6C shows an example of a screen 600c of an application displayed on an event display system, in accordance with some embodiments. In this example, the screen 600c corresponds to a screen on the event display system 112. The screen 600c includes an image of a first attendee 616, an image of a second attendee 618, and relationship information 620 relating to the first attendee and the second attendee.

Figure 6D:
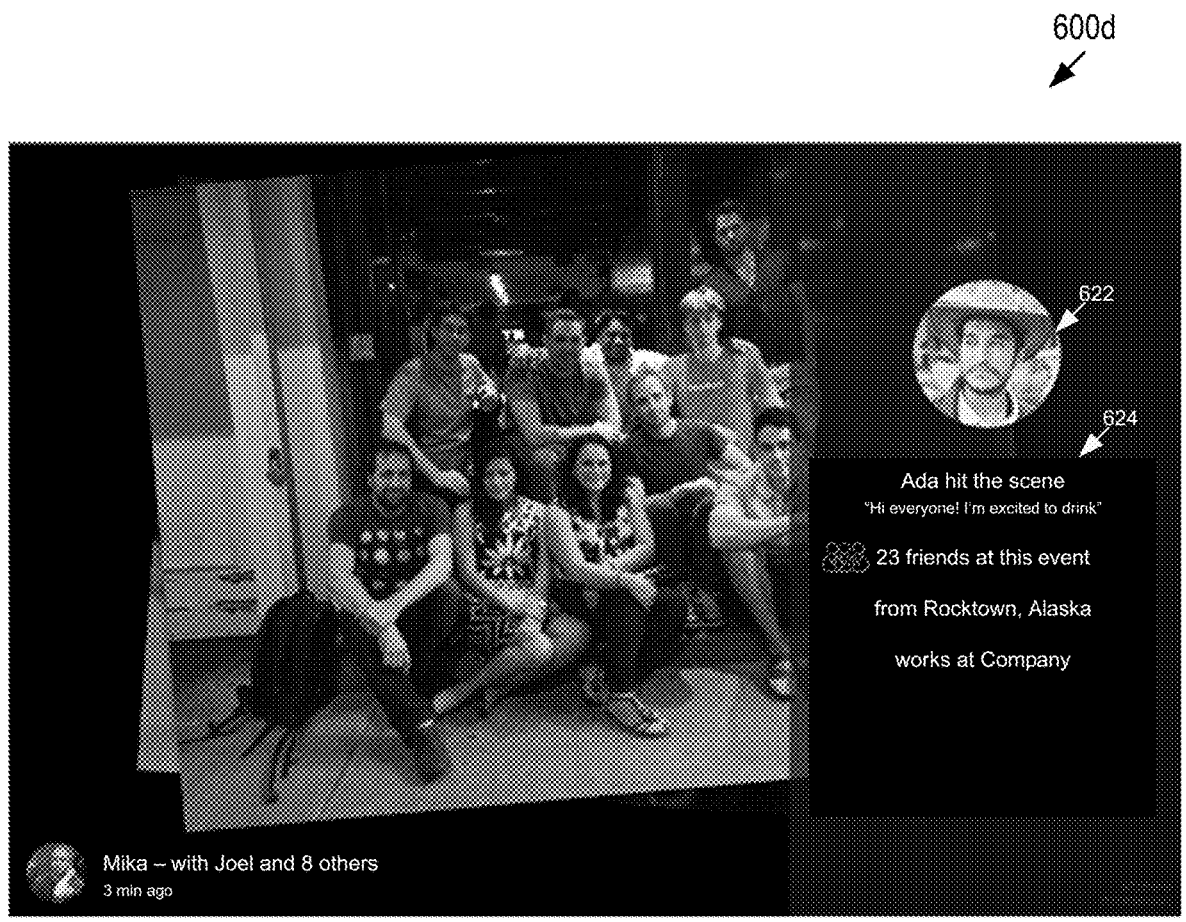
FIG. 6D shows an example screen of an application on an event display system, in accordance with some embodiments.

FIG. 6D shows an example of a screen 600d of an application displayed on an event display system, in accordance with some embodiments. In this example, the screen 600d corresponds to a screen on the event display system 112. The screen 600d includes an image of an event attendee 622 and attendee information 624. The attendee information 624 includes information regarding attendance of the event attendee at the event, a note of introduction by the event attendee, the number of connections of the event attendee present at the event, residential information of the event attendee, and employment information about the event attendee. Other types of information can be included. The attendee information 624 provides relevant information about the attendee to help the attendee build relationships with other attendees.

Figure 6E:
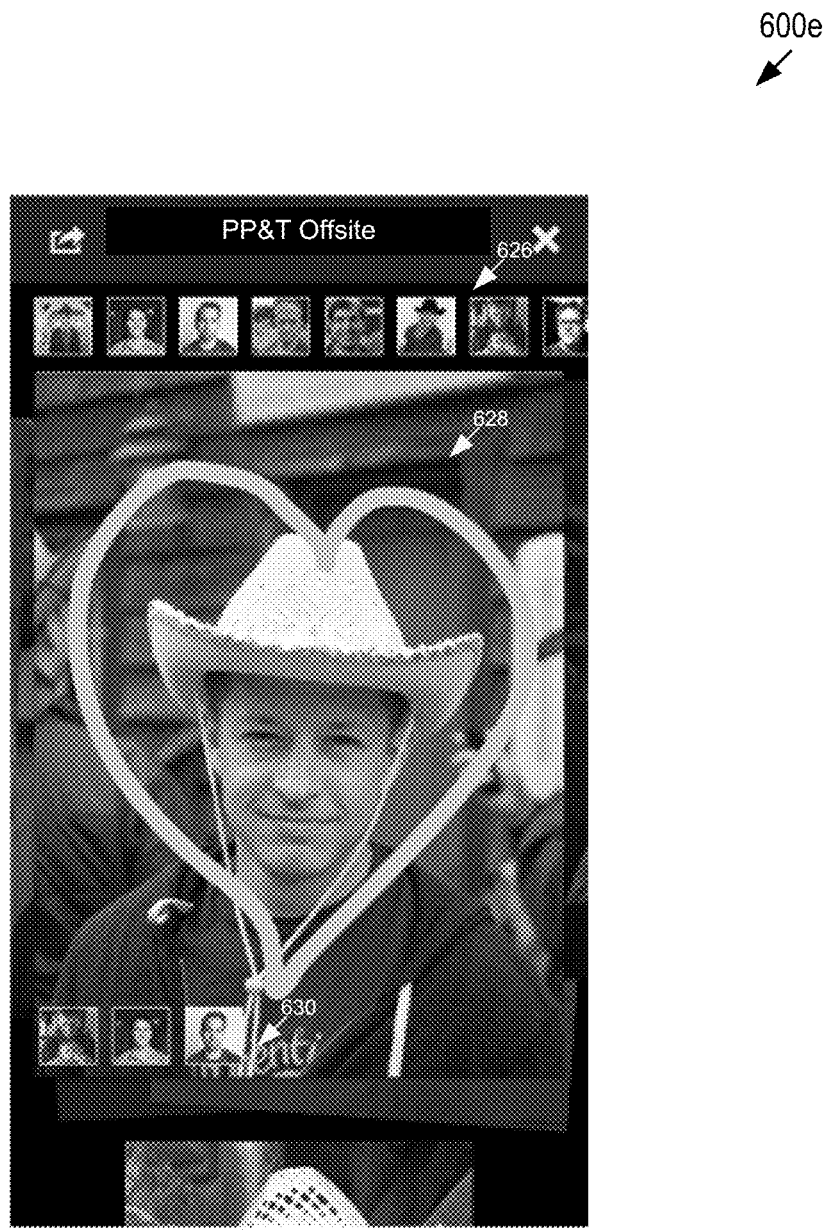
FIG. 6E shows an example screen of an application on an event host system or an event guest system, in accordance with some embodiments.

FIG. 6E shows an example of a screen 600e of an application displayed on an event host system or an event guest system, in accordance with some embodiments. In this example, the screen 600e corresponds to a screen of a special mode (event mode) of a social networking application on one of the event attendee and invitee systems 102. The screen 600e includes an attendee roster 626, an image 628, and a content contributor list 630. The attendee roster 626 provides a list of all event attendees present at the event. The image 628 is shown with a "doodle" that has been drawn by an event attendee. The content contributor list 630 shows a list of event attendees who have participated in the previous editing of the image 628. When the editing of the image 628 is complete, the image 628 can be uploaded for potential integration into event media for the event.

Social Networking System—Example Implementation

Figure 7:
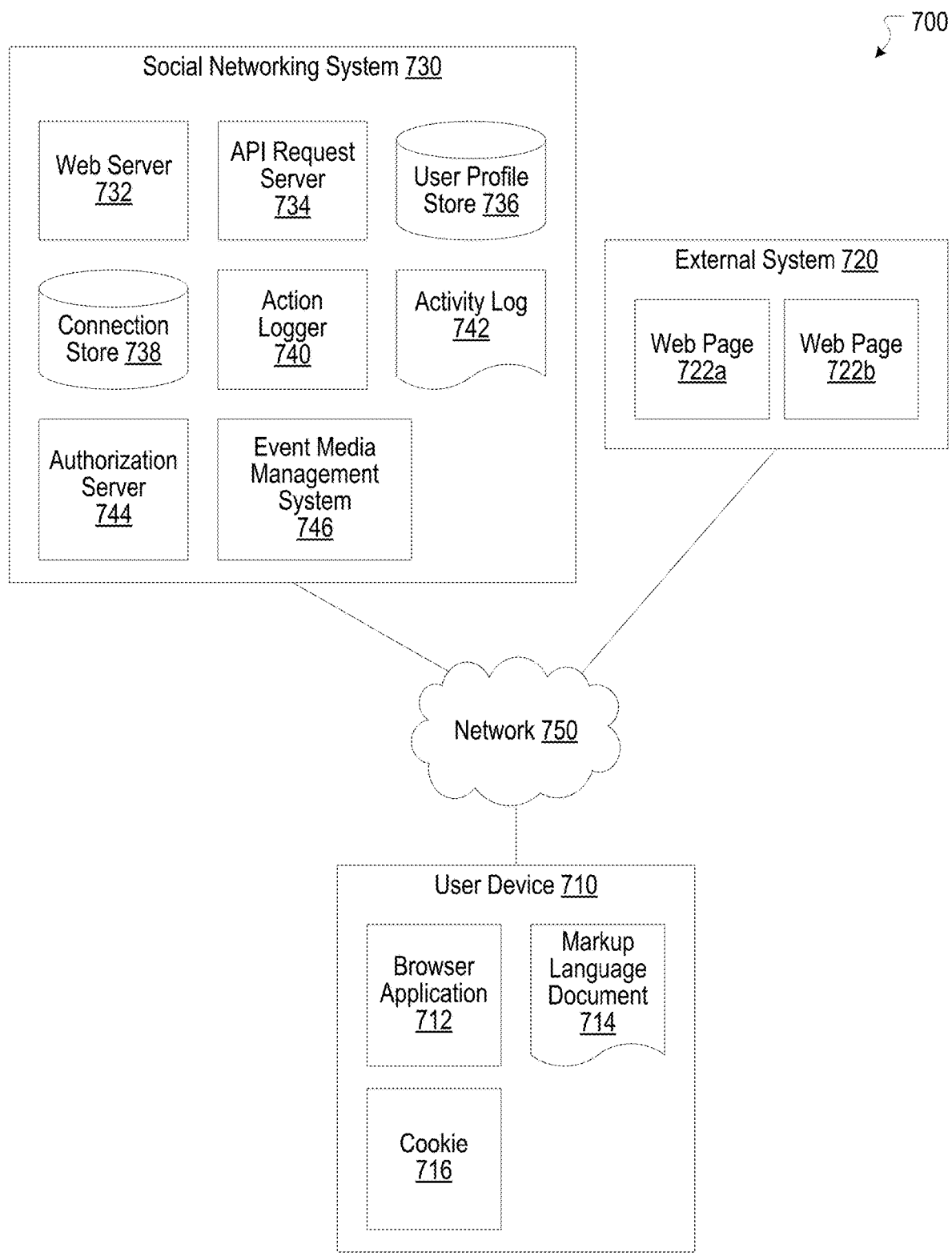
FIG. 7 is a network diagram of an example social networking environment in which to implement the elements of the tag prediction system, in accordance with some embodiments.

FIG. 7 is a network diagram of an example social networking environment 700 in which to implement the elements of the diagram 100 of the event media management environment, in accordance with some embodiments. The social networking environment 700 includes one or more user devices 710, one or more external systems 720, a social networking system 730, and a network 750. In an embodiment, the social networking system discussed in connection with the embodiments described above may be implemented as the social networking system 730. For purposes of illustration, the embodiment of the social networking environment 700, shown by FIG. 7, includes a single external system 720 and a single user device 710. However, in other embodiments, the social networking environment 700 may include more user devices 710 and/or more external systems 720. In certain embodiments, the social networking system 730 is operated by a social networking system provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). In various embodiments, the network 750 may be implemented as the network 750.

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714. In an embodiment, the user device 710 may include a client application module. The client application module may be implemented with the social networking (mobile) application, as discussed herein.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content. The external system may also include content module(s) 724, as described in more detail herein. In various embodiments, the content module(s) 724 may be implemented as the content module(s) 72.

The social networking system 730 includes one or more computing devices for a social networking system, including a plurality of users, and providing users of the social networking system with the ability to communicate and interact with other users of the social networking system. In some instances, the social networking system can be represented by a graph, i.e., a data structure including edges and nodes. Other data structures can also be used to represent the social networking system, including but not limited to databases, objects, classes, Meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, an authorization server 744, an event media management system 746, and content system(s) 748. In an embodiment, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 420. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

The social networking system 730 may include the event media management system 746. In an embodiment, the event media management system 746 may be implemented as the event media management system 110, shown in FIG. 1 and discussed further herein.

Hardware Implementation

Figure 8:
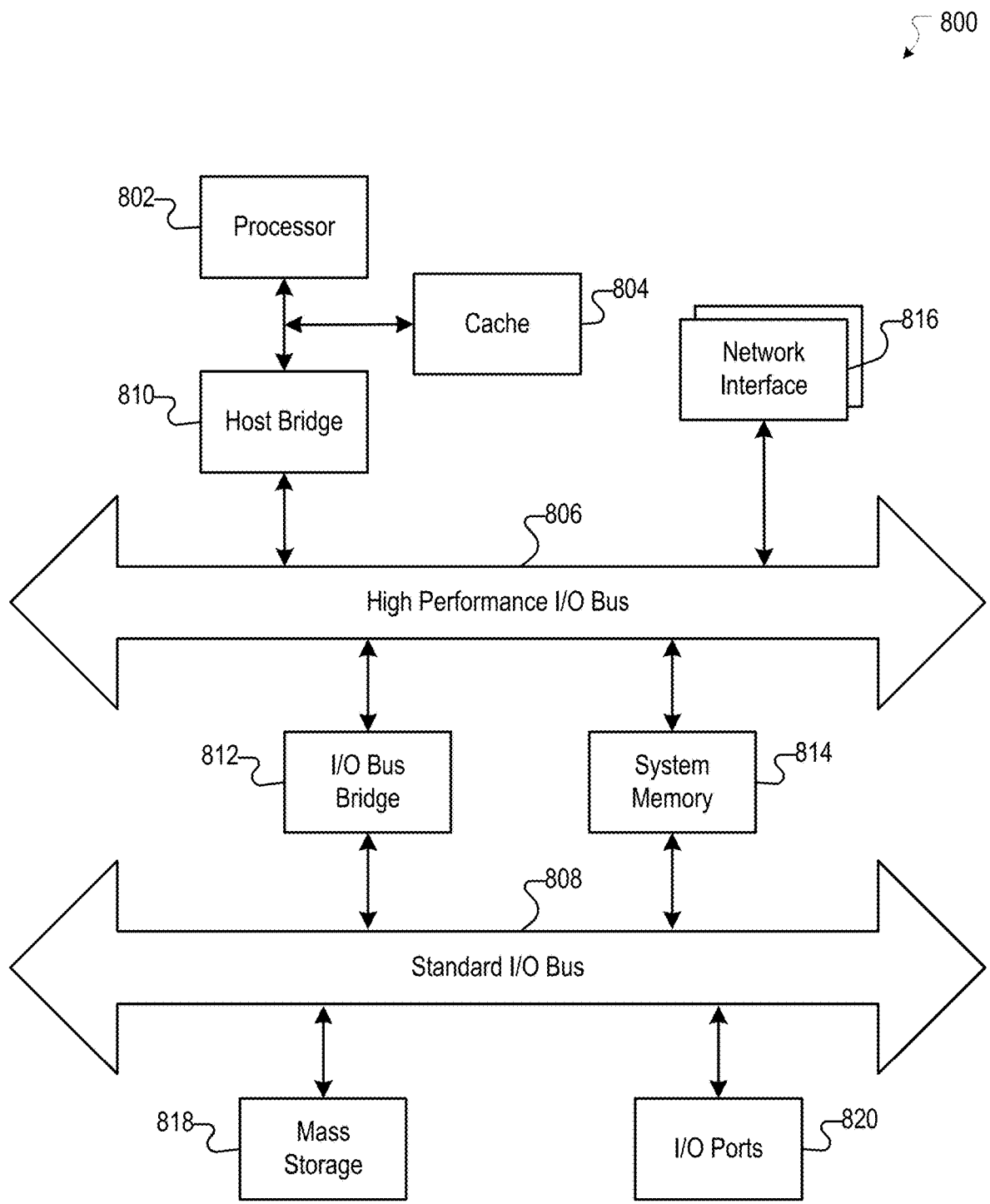
FIG. 8 shows an example diagram of a computer system that may be used to implement one or more of the embodiments described herein in accordance with some embodiments.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment, the computer system 800 may reside with the social networking system 730, the device 68, and the external system 720, or a component thereof. In an embodiment, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and a network interface 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A computer implemented method comprising:
    receiving, by a computing system, information about an event;
    inviting, by the computing system, event attendees to the event;
    determining, by the computing system, a presence of a first event attendee of the event attendees at the event;
    receiving, by the computing system, content from the event attendees present at the event and an event host;
    integrating, by the computing system, the content into event media associated with a social networking system;
    determining, by the computing system, first event media for presentation on an event display system visible to the event attendees, wherein the first event media ranks the content based at least in part on a number of the event attendees depicted in each of the content and ranks the content provided by the event host higher than the content provided by the event attendees;
    determining, by the computing system, second event media for presentation on a computing device of the first event attendee, wherein the second event media comprises the content identified as relevant to the first event attendee based on a social affinity within the social networking system;
    providing, by the computing system, the first event media for presentation on the event display system during the event;
    modifying, by the computing system, the first event media presented on the event display system based at least in part on a manual drawing by the event attendees during the event; and
    providing, by the computing system, the modified first event media for presentation to at least one event invitee after the event.

2. The computer implemented method of claim 1, further comprising integrating notifications into the event media.

3. The computer implemented method of claim 1, further comprising causing an application on at least one of: the computing device of the first event attendee or a computing device of the at least one event invitee to enter a special mode to receive the event media in response to at least one of the determining the presence of the first event attendee at the event or a determining an arrival time associated with occurrence of the event.

4. The computer implemented method of claim 1, further comprising receiving position and time information from the computing device of the first event attendee to determine whether the first event attendee is present at the event.

5. The computer implemented method of claim 1, further comprising ranking the content prior to the integrating the content into event media.

6. The computer implemented method of claim 1, further comprising receiving information from a computing device associated with the event host to control the integrating the content into event media.

7. The computer implemented method of claim 1, further comprising providing the first event media to a computing device associated with the event host in communication with the event display system.

8. The computer implemented method of claim 1, further comprising identifying content relevant to the event attendees based on respective social affinities to select the first event media.

9. A system comprising:

at least one processor; and a memory storing instructions configured to instruct the at least one processor to perform:

receiving information about an event;

inviting event attendees to the event;

determining a presence of a first event attendee of the event attendees at the event;

receiving content from the event attendees present at the event and an event host;

integrating the content into event media associated with a social networking system;

determining first event media for presentation on an event display system visible to the event attendees, wherein the first event media ranks the content based at least in part on a number of the event attendees depicted in each of the content and ranks the content provided by the event host higher than the content provided by the event attendees;

determining second event media for presentation on a computing device of the first event attendee, wherein the second event media comprises the content identified as relevant to the first event attendee based on a social affinity within the social networking system;

providing the first event media for presentation on the event display system during the event;

modifying the first event media presented on the event display system based at least in part on a manual drawing by the event attendees during the event; and providing the modified first event media for presentation to at least one event invitee after the event.

10. The system of claim 9, further comprising integrating notifications into the event media.

11. The system of claim 9, further comprising causing an application on at least one of: the computing device of the first event attendee or a computing device of the at least one event invitee to enter a special mode to receive the event media in response to at least one of: the determining the presence of the first event attendee at the event or a determining an arrival time associated with occurrence of the event.

12. The system of claim 9, further comprising receiving position and time information from the computing device of the first event attendee to determine whether the first event attendee is present at the event.

13. The system of claim 9, further comprising receiving information from a computing device associated with the event host to control the integrating the content into event media.

14. A non-transitory computer storage medium storing computer-executable instructions that, when executed, cause a computer system to perform a computer-implemented method comprising:

receiving information about an event;

inviting event attendees to the event;

determining a presence of a first event attendee of the event attendees at the event;

receiving content from the event attendees present at the event and an event host;

integrating the content into event media associated with a social networking system;

determining first event media for presentation on an event display system visible to the event attendees, wherein the first event media ranks the content based at least in part a number of the event attendees depicted in each of the content and ranks the content provided by the event host higher than the content provided by the event attendees;

determining second event media for presentation on a computing device of the first event attendee, wherein the second event media comprises the content identified as relevant to the first event attendee based on a social affinity within the social networking system;

providing the first event media for presentation on the event display system during the event;

modifying the first event media presented on the event display system based at least in part on a manual drawing by the event attendees during the event; and providing the modified first event media for presentation to at least one event invitee after the event.

15. The non-transitory computer storage medium of claim 14, further comprising integrating notifications into the event media.

16. The non-transitory computer storage medium of claim 14, further comprising causing an application on at least one of: the computing device of the first event attendee or a computing device of the at least one event invitee to enter a special mode to receive the event media in response to at least one of: the determining the presence of the first event attendee at the event or a determining an arrival time associated with occurrence of the event.

17. The non-transitory computer storage medium of claim 14, further comprising receiving position and time information from the computing device of the first event attendee to determine whether the first event attendee is present at the event.

18. The non-transitory computer storage medium of claim 14, further comprising receiving information from a computing device associated with the event host to control the integrating the content into event media.

* * * * *